United States Patent [19]
Jackson

[11] 4,303,579
[45] Dec. 1, 1981

[54] VINYL ESTER RESINS HAVING IMPROVED COLOR

[75] Inventor: Roy J. Jackson, Houston, Tex.

[73] Assignee: Shell Oil Company, Houston, Tex.

[21] Appl. No.: 166,431

[22] Filed: Jul. 7, 1980

[51] Int. Cl.³ .............................................. C08K 5/13
[52] U.S. Cl. ..................... 260/45.95 E; 260/45.95 H; 260/45.85 B
[58] Field of Search ..................... 525/529, 530, 531; 260/45.95 E, 45.85 B

[56] References Cited

U.S. PATENT DOCUMENTS

| | | | |
|---|---|---|---|
| 2,633,458 | 3/1953 | Shokal | 260/837 |
| 3,285,855 | 11/1966 | Dexter et al. | 260/45.85 B |
| 3,336,241 | 8/1967 | Shokal | 260/2 |
| 3,356,624 | 12/1967 | Neal et al. | 260/18 |
| 3,377,406 | 4/1968 | Newey et al. | 260/837 |
| 3,408,219 | 10/1968 | Neal et al. | 260/837 |
| 3,408,422 | 10/1968 | May | 260/837 |
| 3,446,762 | 5/1969 | Lopez et al. | 260/18 |
| 3,502,613 | 3/1970 | Berger | 260/45.8 |
| 3,634,542 | 1/1972 | Dowd et al. | 260/837 |
| 3,637,618 | 1/1972 | May | 260/837 |
| 4,014,771 | 3/1977 | Rosenkranz et al. | 525/531 |
| 4,049,745 | 9/1977 | Schuster et al. | 525/531 |

*Primary Examiner*—V. P. Hoke
*Attorney, Agent, or Firm*—Norris E. Faringer

[57] ABSTRACT

The present invention provides stable vinyl ester compositions exhibiting improved color stability comprising a vinyl ester resin prepared by esterifying an epoxy compound with an ethylenically unsaturated monocarboxylic acid and a stabilizer composition comprising hydroquinone and a sterically hindered phenol.

10 Claims, No Drawings

VINYL ESTER RESINS HAVING IMPROVED COLOR

BACKGROUND OF THE INVENTION

Hydroxy-containing ethylenically unsaturated polyesters prepared from glycidyl polyethers of polyhydric phenols and ethylenically unsaturated monocarboxylic acids tend toward premature gelation both during the esterification step and during subsequent storage of the polyesters. Such premature gelation can be significantly reduced by the addition of compounds such as dialkylhydroxylamines and the like. See, for example, U.S. Pat. No. 3,408,422, issued Oct. 29, 1968. The use of hydroquinone as a gelation inhibitor in vinyl ester formulations is well-known and universally employed. In fact, the hydroquinone is frequently introduced into the vinyl ester through the ethylenically unsaturated monocarboxylic acid. In other words, the acrylic or methacrylic acid used to prepare the vinyl esters contain hydroquinone as an inhibitor. Under certain conditions, more hydroquinone is added during the esterification step or to the finished vinyl ester and styrene blend. As noted hereinbefore, other stabilizers may also, and usually are, used in combination with the hydroquinone, such as maleic anhydride, diethylhydroxylamine, para-toluenesulfonic acid, triethyl phosphite, and the like.

It is not uncommon to produce vinyl ester compositions containing up to 600 parts per million of hydroquinone in the vinyl ester or blend thereof. It is known that while the presence of hydroquinone stabilizes the vinyl ester, the resulting vinyl ester possesses color which is undersireable for many applications. It is believed that the hydroquinone oxidizes to benzoquinone and oxidized products of benzoquinone, which products impart the undesirable color to the vinyl esters and styrene blends thereof.

It has now been found that the color of the vinyl esters can be significantly improved by the addition of the so-called "heat" stabilizers, which are well-known antioxidants for polyolefins such as polypropylene. See, for example, U.S. Pat. No. 3,502,613, issued Mar. 24, 1970. It has further been found that the hydroquinone can be reduced to levels of below about 400 ppm and generally below 200 ppm.

SUMMARY OF THE INVENTION

The present invention provides a vinyl ester composition possessing improved color. More particularly, the invention is directed to a storage-stable vinyl ester composition possessing improved color which comprises (1) a vinyl ester prepared by reacting a polyepoxide containing at least one vicinal-epoxy group with an ethylenically unsaturated monocarboxylic acid, preferably in the presence of an esterification catalyst, and stabilized against gelation with hydroquinone and (2) a "heat" stabilizer such as a sterically hindered phenol.

DESCRIPTION OF THE PREFERRED EMBODIMENTS

The present invention provides a storage-stable vinyl ester composition having improved color which comprises (1) a vinyl ester prepared by reacting a polyepoxide with an ethylenically unsaturated monocarboxylic acid, preferably in the presence of an esterification catalyst, and (2) a stabilizer combination comprising (a) from about 2 to about 400 parts per million (ppm) of hydroquinone and (b) from about 2 to about 600 ppm of a "heat" stabilizer, based on the vinyl ester. The vinyl ester may be further modified by reaction with a polycarboxylic acid anhydride such as maleic anhydride and/or may be blended with a compatible unsaturated monomer such as styrene. One or more other conventional inhibitors such as para-toluenesulfonic acid may be additionally employed.

The preparation of suitable vinyl esters, modified vinyl esters and blends thereof is well-known. See, for example, U.S. Pat. No. 3,634,542, issued Jan. 11, 1972, and the disclosure relevant to the preparation of such vinyl esters is incorporated herein by reference.

Most preferred polyesters include the vinyl esters, particularly the vinyl esters prepared by the esterification of polyepoxides with ethylenically unsaturated acids.

Suitable polyethylenically unsaturated polyesters (vinyl esters) have the general formula

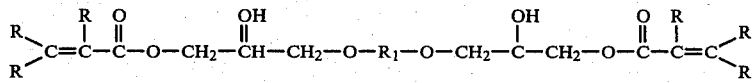

wherein R is hydrogen or an alkyl radical and $R_1$ is an aromatic radical. Generally, these polyesters are prepared by esterifying a polyepoxide, preferably a glycidyl polyether of a polyhydric phenol, with at least one ethylenically unsaturated carboxylic acid, preferably in the presence of an esterification catalyst.

The polyepoxides used to prepare the vinyl ester compositions comprise those compounds containing at least one vicinal epoxy group; i.e., at least one

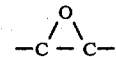

group. These polyepoxides may be saturated or unsaturated, aliphatic, cycloaliphatic, aromatic or heterocyclic and may be substituted if desired with non-interfering substituents such as halogen atoms, hydroxyl groups, ether radicals, and the like. They may also be monomeric or polymeric.

For clarity, many of the polyepoxides and particularly those of the polymeric type are described in terms of epoxy equivalent values. The meanings of this expression is described in U.S. Pat. No. 2,633,458. The polyepoxides used in the present process are preferably those having an epoxy equivalency greater than 1.0.

Various examples of liquid polyepoxides that may be used in the process of the invention are given in U.S. Pat. No. 2,633,458 and it is to be understood that so much of the disclosure of that patent relative to examples of polyepoxides is incorporated by reference into this specification.

Other suitable polyepoxides are disclosed in U.S. Pat. Nos. 3,356,624, 3,408,219, 3,446,762 and 3,637,618 and so much of the disclosure relevant to examples of epoxy compounds is incorporated by reference into this specification.

Preferred polyepoxides are the glycidyl polyethers of polyhydric phenols and polyhydric alcohols, especially the glycidyl polyethers of 2,2bis(4-hydroxyphenyl)propane having an average molecular weight between about 300 and 3,000 and an epoxide equivalent weight between about 140 and 2,000.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or (2) by the reaction of hydrogenated polyhydric phenols with epichlorohydrin in the presence of a suitable catalyst such as Lewis acids, i.e., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by dehydrohalogenation in the presence of caustic. When the phenol is Bisphenol A, the resulting saturated epoxy compound is sometimes referred to as "diepoxidized hydrogenated Bisphenol A," or more properly as the diglycidyl ether of 2,2-bis(4-cyclohexanol)propane.

In any event, the term "saturated epoxy resin," as used herein shall be deemed to mean the glycidyl ethers or polyhydric phenols wherein the aromatic ring structure of the phenols have been or are saturated.

An idealized structural formula representing the preferred saturated epoxy compounds is as follows:

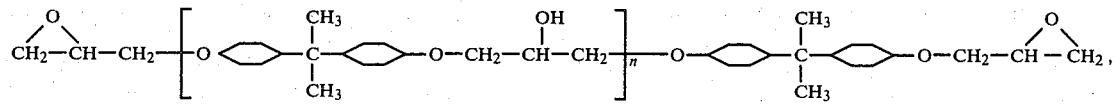

wherein n has a value so that the average molecular weight of the saturated polyepoxide is from about 350 to about 3000.

Preferred saturated epoxy resins are the hydrogenated resins prepared by the process described in U.S. Pat. No. 3,336,241. More preferred are the hydrogenated glycidyl ethers of 2,2-bis(4-hydroxyphenyl)propane, sometimes called the diglycidyl ethers of 2,2-bis(4-cyclohexanol) propane.

The organic carboxylic acid used to esterify the polyepoxide may be saturated, unsaturated, aliphatic, cycloaliphatic or aromatic and may be monocarboxylic or polycarboxylic. The preferred acids to be employed are the monocarboxylic acids, such as acetic acid, propionic acid, benzoic acid, toluic acid, cyclohexanecarboxylic acid, methylcyclohexanecarboxylic acid, cyclopentanecarbocyclic acid, acrylic acid, methacrylic acid, stearic acid, lauric acid, dodecanoic acid, chloracetic acid, phenoxyacetic acid and the like.

Particularly preferred acids to be utilized comprise the ethylenically unsaturated acids such as, for example, acrylic acid, methacrylic acid, crotonic acid, alpha-phenylacrylic acid, alphacyclohexlacrylic acid, maleic acid, alpha-chloromaleic acid, tetrahydrophthalic acid, itaconic acid fumaric acid, cyanoacrylic acid, methoxyacrylic acid, and the like.

Also particularly preferred are the partial esters of polycarboxylic acids, and particularly the alkyl, alkenyl, cycloalkyl and cycloalkenyl esters of polycarboxylic acids such as for example, allyl hydrogen maleate, butyl hydrogen maleate, allyl hydrogen phthalate, allyl hydrogen succinate, allyl hydrogen fumarate, butenyl hydrogen tetrahydrophthalate, cyclohexenyl hydrogen maleate, cyclohexyl hydrogen tetrahydrophthalate, and the like, and mixtures thereof.

An esterification catalyst is not required, however, the use of such a catalyst is highly desired. In general, any esterification catalyst is suitable for use to prepare vinyl esters including the metal hydroxides such as sodium hydroxide; tin salts such as stannous octoate; phosphines such as triphenyl phosphine; the onium salts such as the phosphonium salts, including the phosphonium and ammonium halides.

Preferred esterification catalysts comprise the onium salts, and preferably those containing phosphorus, sulfur or nitrogen, such as, for example, the phosphonium, sulfonium and ammonium salts of inorganic acids. Examples of these include, among others, benzyltrimethylammonium sulfate, tetramethylammonium chloride, benzyltrimethylammonium sulfate, tetramethylammonium chloride, benzyltrimethylammonium nitrate, diphenyldimethylammonium chloride, benzyltrimethylammonium chloride, diphenyldimethylammonium nitrate, diphenylmethylsulfonium chloride, tricyclohexylsulfonium bromide, triphenylmethylphosphonium iodide, diethyldibutylphosphonium nitrate, trimethylsulfonium chloride, dicyclohexyldialkylphosphonium iodide, benzyltrimethylammonium thiocyanate, and the like, and mixtures thereof.

Preferred onium salts to be employed include those of the formula:

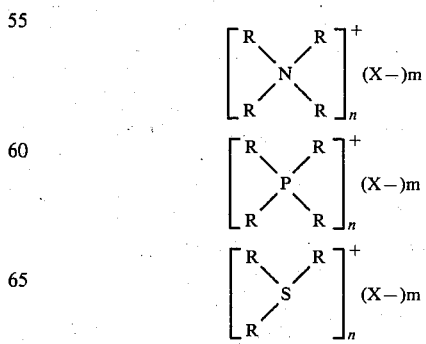

wherein R is a hydrocarbon radical, and preferably an aryl, alkyl, alkenyl, cycloalkyl, cycloalkenyl or alkaryl radical containing up to 12 carbon atoms, X is an ion of an inorganic acid, and particularly a halogen atom, nitrate, sulfate or phosphate radical, m is the valency of the X ion and n=m.

The preparation of suitable vinyl esters is well known. See, for example, U.S. Pat. No. 3,377,406, describing a very suitable process for preparing vinyl esters. Accordingly, the disclosure relevant to the preparation of vinyl esters is hereby incorporated and made a part of the instant specification.

The amount of the above-noted polyepoxide and acid to be used in the reaction may vary over a wide range. In general, these reactants are used in approximately chemical equivalent amounts. As used herein and in the appended claims a chemical equivalent amount of the polyepoxide refers to that amount needed to furnish one epoxy group per carboxyl group. Excess amounts of either reactant can be used. Preferred amounts range from about 0.5 to 2 equivalents of carboxylic acid per equivalent of epoxide.

The amount of the catalyst employed may also vary over a considerable range. In general, the amount of the catalyst will vary from about 0.01% to about 3% by weight, and more preferably from 0.3% to 2% by weight of the reactants.

The reaction may be conducted in the presence or absence of solvents or diluents. In most cases, the reactants will be liquid and the reaction may be easily effected without the addition of solvents or diluents. However, in some cases, whether either or both reactants are solids or viscous liquids it may be desirable to add diluents to assist in effecting the reaction. Examples of such materials include the inert liquids, such as inert hydrocarbons as xylene, toluene, cyclohexane and the like.

If solvents are employed in the reaction and the resulting product is to be used for coating purposes, the solvent may be retained in the reaction mixture. Otherwise, the solvent can be removed by any suitable method such as by distillation and the like. If the product is not to be used for sometime after its formation, it may also be desirable to remove the catalyst used in the preparation, such as by stripping, neutralization and the like.

Temperatures employed in the reaction will generally vary from about 50° C. to about 150° C. In most cases, the reactants will combine in the presence of the new catalysts at a very rapid rate and lower temperatures will be satisfactory. Particularly preferred temperatures range from about 50° C. to 120° C.

The reaction will be preferably conducted under atmospheric pressure, but it may be advantageous in some cases to employ subatmospheric or superatmospheric pressures.

The course of the reaction may be conveniently followed by determination of the acidity. The reaction is considered to be substantially complete when the acidity has been reduced to about 0.015 eq/100 grams or below.

The process of the invention may be effected in any suitable manner. The preferred method merely comprises adding the polyepoxide, acid, catalyst, and solvent or diluent if desired, in any order and then applying the necessary heat to bring about the reaction. The reaction mixture may then be distilled or stripped to remove any of the unnecessary components, such as solvent, catalyst, excess reactants and the like.

The polyester products obtained by the above process will vary from liquids to solid resins. The products will possess a plurality of free OH groups and a plurality of ethylenic groups. The products will be of higher molecular weight than the basic polyepoxide from which they are formed and will possess at least more than one ester group per polyepoxide unit.

These vinyl esters may then be modified, if desired, by further reaction with a polycarboxylic acid anhydride such as maleic anhydride according to the procedure described in U.S. Pat. No. 3,634,542.

The resulting vinyl esters or modified vinyl esters may be mixed or blended with one or more compatible unsaturated monomers, examples of such monomers include, among others, aromatic compounds such as styrene, alpha-methylstyrene, dichlorostyrene, vinyl naphthalene, vinyl phenol and the like, unsaturated esters, such as acrylic and methacrylic esters, vinyl laurate, and the like, unsaturated acids, such as acrylic and alpha-alkylacrylic acids, butenoic acid, allylbenzoic acid, vinylbenzoic acid, and the like, halides, such as vinyl chloride, vinylidene chloride, nitriles, such as acrylonitrile, methacrylonitrile, diolefins, such as butadiene, isoprene, methylpentadiene, esters of polycarboxylic acids, such as diallyl phthalate, divinyl succinate, diallyl mateate, divinyl adipate, dichloroallyl tetrahydrophthalate, and the like, and mixtures thereof.

The amount of unsaturated monomer will vary widely; however, the weight ratio of polyester to unsaturated monomer will generally vary from about 100.0:0.0 to about 30.0:70.0, with from about 95.0:5.0 to about 35.0:65.0 being preferred, and from about 60.0:40.0 to 40.0:60.0 being especially preferred.

Especially preferred unsaturated comonomers are the aromatic unsaturated compounds such as styrene, vinyl toluene and divinyl benzene.

The stabilizer combination of the present invention comprises (1) hydroquinone and (2) at least one "heat" stabilizer. Other conventional stabilizers such as maleic anhydride, triethylphosphite, diethylhydroxylamine, and paratoluene sulfonic acid may be, and usually are also employed.

Suitable "heat" stabilizers include the sterically hindered phenols, sulfides and amines.

One suitable "heat" stabilizer has the general formula:

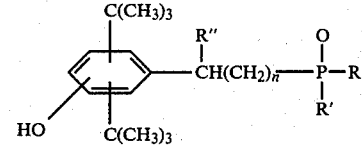

wherein R and R' are the same or different alkoxy groups containing from about 12 to about 24 carbon atoms, R" is hydrogen or an alkyl having 1 to 6 carbon atoms and n is an integer having a value 0, 1, 2, or 3.

Still other "heat" stabilizers include the dialkyl esters of beta-thiodipropionic acid wherein the alkyl group contains from 12 to 30 carbon atoms, and is preferably dilauryl thiodipropionate (DLTP) or distearyl thiodipropionate (DSTP).

Examples of especially preferred "heat" stabilizers include, among others, 2,6 di-tertiary butyl-4-methylphenol, 1,3,5-trimethyl-2,4,6-tri(3',5'-di-tertiarybutyl-4'-hydroxybenzyl)benzene, octadecyl 3-(3',5'-di-tertiary butyl-4'-hydroxyphenyl)propionate, 4,4'-methylene bis(2,6-di-tertiary butylphenol), zinc dibutyl dithiocarbamate. Exceptional color stability is achieved with these sterically hindered phenols.

The hydroquinone is preferably added during the esterification step but may be added at any time and the "heat" stabilizer is preferably added to the finished vinyl ester or vinyl ester/styrene blend.

In general, the amount of each stabilizer employed in the blend will vary widely. Accordingly, a stabilizing amount consistent with the end color desirable is employed. Operable amounts usually range from about 2 to about 400 ppm of hydroquinone and from about 2 to about 600 ppm of the "heat" stabilizer, based on the weight of the resin. A very effective amount is from about 50 to about 250 ppm of hydroquinone and from about 50 to about 500 ppm of "heat" stabilizer. The amount of any additional gellation inhibitor may vary widely and may range from about 100 to about 10,000 ppm.

The resulting stabilized vinyl ester or vinylester blend can be converted to very suitable coating with the addition of a curing agent or use of UV-radiation.

Examples of suitable polyester curing agents (catalysts) are the free-radical yielding compounds and suitable radiation. Examples of such catalysts includes the peroxides, such as benzoyl peroxide, tertiary butyl hydroperoxide, ditertiary butyl peroxide, hydrogen peroxide, potassium persulfate, methyl cyclohexyl peroxide, cumene hydroperoxide, acetyl benzoyl peroxide. Tetralin hydroperoxide, phenylcyclohexane hydroperoxide, tertiary butylisopropylbenzene hydroperoxide, tertiary butylperacetate, tertiary butylacetate, tertiary butyl perbenzoate, ditertiary amyl perphthalate, ditertiary butyl peradipate, tertiary amyl percarbonate, and the like, and mixtures thereof; azo compounds such as 2,2'-azobisisobutyronitrile, dimethyl 2,2'-azobisisobutyrate, 2,2'-azobis(2,4-diamethylvaleronitrile, 2,2'-azobisisotulyamide, and the like. Particularly preferred catalysts include the diaroyl peroxide, tertiary alkyl hydroperoxides, alkyl peresters of percarboxylic acids and particularly those of the above noted groups which contain no more than 18 carbon atoms per molecular and have a decomposition temperature below 125° C.

Of course, other materials may be mixed or added, including, plasticizers, stabilizers, extenders, oils, resins, tars, asphalts, pigments, reinforcing agents, thioxotropic agents, and the like.

The present compositions may be utilized in many applications such as for coatings and impregnating compositions in the preparation of adhesives for metals, wood, cement and the like, and in the preparation of reinforced composite products, such as laminated products, filament windings, sheet molding compounds (SMC), electrical laminates. A very suitable application is in the preparation of reinforced products and laminates wherein the compositions are applied to fibrous products such as glass fibers or sheets and the material formed into the desired object and cured. Another suitable application is for use as container coatings and the like.

The following examples are given to illustrate the improvement in color stability achieved by the instant stabilizer combination when used in a vinyl ester composition. It is understood that the examples are embodiments only and are given for the purpose of illustration and the invention is not to be regarded as limited to any specific components and/or specific conditions recited therein. Unless otherwise indicated, parts and percentages in the examples, are parts and percentages by weight. Epoxy Resin A is a liquid glycidyl polyether 2,2-bis(4-hydroxyphenyl)propane having an epoxide equivalent weight of 175–190 and an average molecular weight of about 350.

EXAMPLE I

Into a three-liter flask equipped with stirrer, thermometer, $N_2$ sparge tube and condenser were placed 1586 grams of Epoxy Resin A, 16.1 grams of tetramethylammonium chloride (TMAC in 50% water) and 0.92 grams of 2,6-di-tertiary butyl-4-methylphenol (393 ppm) and the temperature raised to 116° C. (240° F.). Then 714 grams of glacial methacrylic acid was added over 50 minutes and the temperature held for 4 hours at 116° C. (240° F.). Then 23 grams of paratoluenesulfonic acid (PTSA in 60% water) and 0.46 grams (196 ppm) of hydroquinone were added. The resulting vinyl ester composition exhibited a Gardner Color (80% wt in xylene) of 1.

When 100 grams of the above stabilized vinyl ester composition was cured with 2 grams of methyl ethyl ketone peroxide and 0.4 grams of cobalt naphthanate, the resulting film exhibited excellent physical properties.

When the vinyl ester was prepared without the 2,6-di-tertiary butyl-4-methylphenol, the Gardner color was >3.

EXAMPLE II

The procedure of Example I was substantially repeated except that 75.9 grams of maleic anhydride was used in lieu of the PTSA. Again, the Gardner color with the 2,6-di-tertiary butyl-4-methylphenol was 1 and without the Gardner color was >3.

EXAMPLE III

Related results were obtained when the sterically hindered phenol was 1,3,5-trimethyl-2,4,6-tri(3',5'-ditertiary-butyl-4'-hydroxybenzyl)benzene, octadecyl-3-(3',5'-ditertiary-butyl-4'-hydroxyphenyl) propionate, or 4,4'-methylenebis(2,6-ditertiary butylphenol).

EXAMPLE IV

Related results are obtained when the above stabilized vinyl esters are blended with styrene in a 50:50 blend.

What is claimed is:

1. A storage-stable, curable vinyl ester resin exhibiting improved color prepared by esterifying a glycidyl polyether of a polyhydricphenol with an ethylenically unsaturated monocarboxylic acid in the presence of a stabilizer composition comprising (1) from about 50 to about 250 ppm of hydroquinone, (2) from about 50 to about 500 ppm of a sterically hindered phenol and paratoluenesulfonic acid.

2. The resin composition of claim 1 wherein said curable vinyl ester resin has been further reacted with maleic anhydride.

3. The resin of claim 1 wherein the polyhydric phenol is 2,2-bis(4-hydroxyphenyl)propane.

4. The resin of claim 1 wherein the ethylenically unsaturated monocarboxylic acid is acrylic or methacrylic acid.

5. The resin of claim 1 wherein the sterically hindered phenol is 2,6-tertiary butyl-4-methylphenol.

6. The resin of claim 1 wherein the sterically hindered phenol is 1,3,5-trimethyl-2,4,6-tri(3',5'-di-tertiary butyl-4'-hydroxybenzyl)benzene.

7. The resin of claim 1 wherein the sterically hindered phenol is octadecyl 3-(3',5'-di-tertiary butyl-4'-hydroxyphenyl)propionate.

8. The resin of claim 1 wherein the sterically hindered phenol is 4,4'-methylenebis(2,6-di-tertiary butylphenol).

9. A curable composition comprising the resin of claim 1, a compatible unsaturated comonomer, and a free radical catalyst.

10. The composition of claim 9 wherein the comonomer is styrene.

* * * * *